(12) United States Patent
Kim et al.

(10) Patent No.: US 7,674,546 B2
(45) Date of Patent: Mar. 9, 2010

(54) METALLIC SEPARATOR FOR FUEL CELL AND METHOD FOR ANTI-CORROSION TREATMENT OF THE SAME

(75) Inventors: Tae-young Kim, Seoul (KR); Kyoo-young Kim, Pohang-si (KR); Jung-ock Park, Yongin-si (KR); Duck-young Yoo, Seoul (KR)

(73) Assignee: Samsung SDI Co., Ltd, Suwon (KR)

( * ) Notice: Subject to any disclaimer, the term of this patent is extended or adjusted under 35 U.S.C. 154(b) by 1399 days.

(21) Appl. No.: 11/075,862

(22) Filed: Mar. 10, 2005

(65) Prior Publication Data

US 2005/0208360 A1    Sep. 22, 2005

(30) Foreign Application Priority Data

Mar. 19, 2004    (KR) .................. 10-2004-0018747

(51) Int. Cl.
*H01M 2/00*    (2006.01)
*H01M 2/02*    (2006.01)
*B32B 9/00*    (2006.01)
*B05D 3/02*    (2006.01)

(52) U.S. Cl. .................. 429/34; 428/469; 427/372.2
(58) Field of Classification Search .................. 429/32, 429/38, 34; 585/639; 376/305; 427/372.2; 428/469

See application file for complete search history.

(56) References Cited

U.S. PATENT DOCUMENTS 5,049,458 A  *  9/1991  Sato et al. .................. 429/32

2003/0231973 A1    12/2003  Krumpelt et al.

FOREIGN PATENT DOCUMENTS

| JP | 05036425 | 2/1993 |
| JP | 07153469 | 6/1995 |
| JP | 08273681 | * 10/1996 |
| KR | 2003-0053406 | 6/2003 |

OTHER PUBLICATIONS

Fujita, K., K. Ogasawara, Y. Matsuzaki, and T. Sakurai. "Prevention of SOFC cathode degradation in contact with Cr-containing alloy." Journal of Power Sources 131 (2004): 261-69.*
Japanese Office dated Apr. 15, 2008.

* cited by examiner

*Primary Examiner*—Dah-Wei D Yuan
*Assistant Examiner*—Stephan Essex
(74) *Attorney, Agent, or Firm*—H.C. Park & Associates, PLC

(57) ABSTRACT

The present invention provides a separator for a fuel cell that comprises a metal substrate that contains at least one metal element M and a surface layer formed on a surface of the metal substrate and that contains at least one conductive oxide represented by $LaM_xO_3$ (wherein x=0 to 1). Also, the present invention provides a method for anti-corrosion treatment of a metallic separator for a fuel cell. The method involves first forming an La layer on a surface of a metal substrate having a desired dimension and a desired flow field formed therein. Next, the metal substrate having the La layer on its surface is heated such that at least one metal component contained in the metal substrate is diffused into the La layer and an La component in the La layer is diffused into the metal substrate to form a mixed layer composed of La and the at least one metal component on the surface of the metal substrate. Finally, the mixed layer is heated under an oxidizing atmosphere to form a layer composed of oxides containing La and the at least one metal component on the surface of the metal substrate.

10 Claims, 3 Drawing Sheets

METALLIC SEPARATOR FOR FUEL CELL AND METHOD FOR ANTI-CORROSION TREATMENT OF THE SAME

This application claims the benefit of Korean Patent Application No. 10-2004-0018747, filed on Mar. 19, 2004, in the Korean Intellectual Property Office, the disclosure of which is incorporated herein in its entirety by reference.

BACKGROUND OF THE INVENTION

1. Field of the Invention

The present invention relates to a separator for a fuel cell and a method for anti-corrosion treatment of the same.

2. Description of the Related Art

The operation mechanism of a fuel cell begins by oxidizing a fuel, such as hydrogen, natural gas, and methanol, etc. to produce an electron and a hydrogen ion at the anode of the fuel cell. The hydrogen ion passes through an electrolyte membrane to the cathode and the electron is supplied to an outer circuit through a wire. The hydrogen ion which reaches the cathode is combined with the electron that reaches the cathode through the outer circuit and oxygen gas or oxygen gas in the air to form water.

Fuel cells are regarded as the next-generation energy conversion units since they have a high electricity generation efficiency and are environmentally friendly. Fuel cells are classified into categories including polymer electrolyte membrane fuel cells (PEMFCs), phosphoric acid fuel cells (PAFCs), molten carbonate fuel cells (MCFCs), and solid oxide fuel cells (SOFCs) depending upon the type of electrolyte used. Operation temperature, materials of the constitutional elements etc. can also vary depending on the type of fuel cell.

PEMFCs can be operated at relatively low operation temperatures, i.e., about 80 to 120° C. and have a very high current density, which makes them suitable as a power supply for vehicles and homes etc. The PEMFCs contain a bipolar plate, which is one of the main elements that require improvements to make the PEMFCs compact, light and economical.

The PEMFC comprises a bipolar plate and a membrane electrode assembly (MEA) as its main components. The MEA comprises an anode in which the fuel is oxidized, a cathode in which an oxidizing agent is reduced, and an electrolyte membrane interposed between the anode and the cathode. The electrolyte membrane has an ion conductivity sufficient to deliver a hydrogen ion generated in the anode to the cathode and an electronic insulation sufficient to electronically insulate the anode and the cathode.

It is well known in the art that the bipolar plate has channels for flowing fuels and air and that it also functions as an electron conductor for transporting electrons between MEAs. The bipolar plate should be non-porous such that the fuel and the air can be separated. In addition, it should have excellent electrical conductivity and have sufficient thermal conductivity to control the temperature of the fuel cell. Further, the bipolar plate should have a mechanical strength sufficient to bear a force applied at the time of clamping the fuel cell as well as corrosion-resistance against hydrogen ions.

In the past, graphite was used to make a bipolar plate in the PEMFC, and a channel for a fuel and air was mainly formed by milling. A graphite plate has a sufficient electrical conductivity and resistance to corrosion. However, the graphite plate and its milling process are very expensive. Further, the graphite plate is brittle and it is difficult to process the bipolar plate to a thickness of less than 2-3 mm. Due to a difficulty in decreasing the thickness of the bipolar plate, it is also difficult to decrease the size of a fuel cell stack consisting of several tens to several hundreds of unit cells.

In order to reduce the production costs and the thickness of the bipolar plate, an attempt was made to use a metal to form the bipolar plate. Metals have most of the physical properties necessary for the bipolar plate, and the material and production costs are both very economical. When compared to graphite plates, the costs of the bipolar plate is 1/100 or less of the price of the graphite plate.

However, the metallic bipolar plate may be eroded under the acidic conditions of a fuel cell. This could result in serious problems such as the membrane being poisoned and increased contact resistance. Corrosion of the metallic bipolar plate causes not only defects of the bipolar plate itself, but also electrolyte poisoning due to diffusion of metal ions into the electrolyte membrane. When the electrolyte is poisoned, the conductivity of a hydrogen ion of the electrolyte becomes decreased, thus resulting in deterioration of the performance of a fuel cell. Thus, the use of a metallic bipolar plate is inhibited by such corrosion of the metal.

In a 1000-hour performance test, a PEMFC using a bipolar plate made of, for example, stainless steel, a Ti alloy, or an Ni alloy has a lower performance than PEMFC using a graphite bipolar plate.

Research has been conducted aiming to improve the anti-corrosion of a metallic bipolar plate. Such efforts include a method of applying an anti-corrosive coating to the metallic bipolar plate. For example, a method of coating a material having excellent anti-corrosive effect and electrical conductivity, such as TiN, on a surface of a bipolar plate composed of Ti or stainless steel is disclosed in Korean Laid-Open Patent Publication No. 2003-0053406.

The above discussion relating to a bipolar plate can also be applied to an end plate, cooling plate, and a separator.

It is well known in the art that an end plate is an electronically conductive plate that has channels for a fuel or an oxidizing agent only on one side and is attached to MEAs disposed at both ends of a fuel cell stack, respectively.

It is well known in the art that a cooling plate is an electronically conductive plate that has channels for a fuel or an oxidizing agent on one side and channels of a cooling fluid on the other side.

It is well-known in the art that a separator is used when a flow field is formed in the diffusion layers of an anode and a cathode, and is generally understood as a bipolar plate without a flow field. Advantageously, the separator may have low gas permeability, excellent electrical conductivity, and excellent anti-corrosive effect.

The problems of the bipolar plate of PEMFC were described above, but such problems will also occur in MCFC, PAFC, DMFC, etc.

SUMMARY OF THE INVENTION

The present invention provides a metallic bipolar plate, an end plate, a cooling plate, or a separator for a fuel cell, that have a surface coating containing La-containing oxides.

The present invention also provides a method for an anti-corrosion treatment of a metallic bipolar plate, an end plate, a cooling plate, or a separator for a fuel cell by forming a surface coating of La-containing (Lanthanum) oxides.

In the present invention, the term "separator" is intended to include a bipolar plate, an end plate, a cooling plate, and a separator in a narrow sense as described above, unless specified otherwise. The separator may be used when a flow field is formed in the diffusion layers of an anode and a cathode, and is generally understood as a bipolar plate without a flow field, as described above.

An embodiment of the present invention provides a separator for a fuel cell comprising a metal substrate that contains at least one metal element M and a surface layer formed on a surface of the metal substrate and that contains at least one conductive oxide represented by $LaM_xO_3$, wherein x=0 to 1.

$LaM_xO_3$ is a conductive oxide that has excellent anti-corrosive properties. The metallic separator for a fuel cell according to the present embodiment comprises a surface layer that contains $LaM_xO_3$ and exhibits highly improved corrosion-resistance against a corrosive environment inside the fuel cell.

Another embodiment of the present invention provides a method for anti-corrosion treatment of a metallic separator for a fuel cell, comprising first forming a La layer on a surface of a metal substrate with desired dimensions and a desired flow field formed on it. Next, the metal substrate having the La layer on its surface is heated such that at least one metal component contained in the metal substrate diffuses into the La layer and La component in the La layer diffuses into the metal substrate, to form a mixed layer of La and at least one metal component on the surface of the metal substrate. Finally, the mixed layer is heated under an oxidizing atmosphere to form a layer of oxides containing La and at least one metal component on the surface of the metal substrate.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE INVENTION

Figure 1:
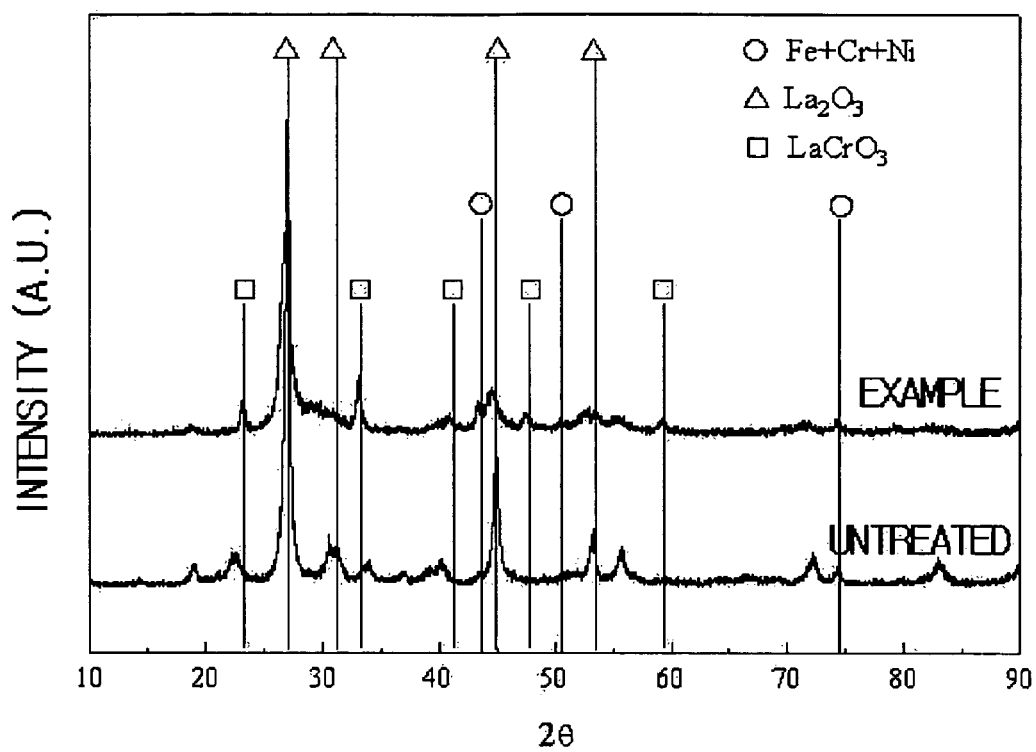
FIG. 1 is a graph that illustrates the results of X-ray diffraction (XRD) analyses for a SUS 904L metal substrate subjected to an anti-corrosion treatment according to an embodiment of the present invention as well as an untreated SUS 904L metal substrate as a comparative example.

Hereinafter, a bipolar plate such as a metallic separator for a fuel cell according to an embodiment of the present invention will be described in detail.

The metallic separator for a fuel cell according to the present embodiment comprises a metal substrate and a surface layer. The surface layer is formed on a surface of the metal substrate.

The metal substrate may have a flow field formed on it in a desired form (in the case of a bipolar plate, an end plate, and a cooling plate). Alternatively, the metal substrate may not have a flow field formed on it as in the case of a separator, where the metal substrate itself may be a separator for a fuel cell. The flow field may have channel patterns in various forms.

The metal substrate is uniformly coated with the surface layer. Although the metal substrate coated with the surface layer undergoes a change of dimension corresponding to the thickness of the surface layer, it maintains the same flow field that formed initially on the metal substrate. That is, the separator according to the present embodiment may be understood as a metal substrate subjected to an anti-corrosion treatment using a surface layer.

The metal substrate contains at least one metal element M. The surface layer contains at least one conductive oxide represented by $LaM_xO_3$, which has excellent anti-corrosive properties. Note that the at least one metal element M contained in the metal substrate is also contained in the conductive oxides represented by $LaM_xO_3$ present in the surface layer.

The separator according to the present embodiment can be produced using the anti-corrosion treatment according to another embodiment of the present invention, as described below. The metal element M contained in the conductive oxide originates from the metal element M contained in the metal substrate. Thus, it is not necessarily required to provide a separate source for the metal element M for constituting the conductive oxides. Moreover, since the conductive oxide layer on the metal substrate is formed due to interdiffusion between La and at least one metal element, pinholes and cracks due to its volume change are substantially absent in the conductive oxide layer.

The conductive oxides represented by $LaM_xO_3$ formed in the separator according to the present embodiment have excellent anti-corrosive properties. Thus, the separator with the surface layer containing $LaM_xO_3$ may exhibit a strong anti-corrosive effect in a corrosive environment inside the fuel cell, although it comprises a metal as a main component. As a result, the separator according to the present embodiment has strong anti-corrosive properties while maintaining the advantages of a metal material described above.

In the conductive oxides represented by $LaM_xO_3$ in the separator according to the present embodiment, a range of x is not specifically limited but is proportional to the electrical conductivity of $LaM_xO_3$. Considering this, x may be at least 0.0001, preferably at least 0.001, and more preferably at least 0.01.

It is noted that as x increases to 1, the specific volume of $LaM_xO_3$ increases rapidly. Thus, if the surface layer contains $LaM_xO_3$ (wherein x is near 1) in a large amount, it is possible that cracks will occur in the surface layer.

In view of the electrical conductivity and the possibility of occurrence of cracks, the amount of $LaM_xO_3$ wherein x is at least 0.95 in the surface layer may be preferably between about 5 to about 75% by weight, and more preferably between about 35 to about 65% by weight.

The metal element M may be at least two metal elements. In this case, $M_x$ may be represented by $M1_{x1}M2_{x2}\ldots$ wherein $x = x1 + x2 \ldots$ In the present embodiment, each range of x1, x2, etc. is not critical and is not specifically limited.

The conductive oxides $LaM_xO_3$ contained in the surface layer may be mixtures of $LaM'_xO_3$, $LaM''_xO_3$, etc. In this case, a mixing ratio of these oxides is not critical and is not specifically limited.

M may be any metal element that can easily form an oxide with La and provide anti-corrosive effect and electrical conductivity of the formed oxide. Examples of the metal element M may include but are not limited to Ni, Ti, Cr, Mo, W, Al, V, Co, Cu, Fe, and Mn or mixtures thereof.

If the thickness of the surface layer is too low, it cannot have a sufficient anti-corrosive effect. If a thickness of the surface layer is too high, it is possible that cracks will occur in the surface layer. In the separator according to the present embodiment, the surface layer may typically have a thickness ranging from about 0.1 to about 500 μm, preferably about 0.5 to about 100 μm, and more preferably about 1 to about 10 μm.

In the separator according to the present embodiment, the metal substrate may be made, for example, of Ni, Ti, or stainless steel. Alternatively, the metal substrate may be made, for example, of an alloy of Ni, Ti, or stainless steel with at least one element such as Al, W, and Cu. The dimension of the metal substrate can be easily selected according to specific designs of the fuel cell by those of ordinary skill in the art. The metal substrate can easily be prepared using conventional metal processing methods.

Hereinafter, the method for anti-corrosion treatment according to another embodiment of the present invention will be described in detail.

The method for anti-corrosion treatment of a separator for a fuel cell comprises first forming a La layer on a surface of a metal substrate having a desired dimension and a desired flow field formed in it. Next, the metal substrate having the La layer on its surface is heated such that at least one metal component contained in the metal substrate is diffused into the La layer and an La component in the La layer is diffused into the metal substrate, to form a mixed layer composed of La and at least one metal component on the surface of the metal substrate. Finally, the mixed layer is heated under an oxidizing atmosphere to form a layer composed of oxides containing La and at least one metal component on the surface of the metal substrate.

In the method according to the present embodiment, at least one metal element contained in the finally formed conductive oxides is originated from the at least one metal element M contained in the metal substrate. Thus, it is not required to provide a separate source for the metal element M, except for La, for constituting the conductive oxides.

This is especially advantageous when forming conductive oxides containing a harmful metal component, such as Cr. Specifically, since stainless steel generally contains Cr, if the stainless steel is used as a component of the metal substrate, it is not required to provide a separate source for Cr, thus allowing an environmentally friendly anti-corrosion treatment according to the present embodiment.

The metal substrate used in the method according to the present embodiment may have a flow field formed therein in a desired form (in the case of a bipolar plate, an end plate, and a cooling plate). Alternatively, the metal substrate may not have a flow field formed therein (in the case of a separator). That is, the metal substrate itself may be a separator for a fuel cell. The flow field may have channel patterns in various forms. The metal substrate may be made, for example, of Ni, Ti, or stainless steel. Alternatively, the metal substrate may be made, for example, of an alloy of Ni, Ti, or stainless steel with at least one element such as Al, W, and Cu. The dimension of the metal substrate can be easily selected according to specific designs of the fuel cell by those of ordinary skill in the art. The metal substrate can be easily prepared using conventional metal processing methods.

In the method according to the present embodiment, an La layer is first coated on a surface of a metal substrate. The coating of La may be performed using a variety of conventional methods used in forming a metal film, such as physical vapor deposition, including vacuum deposition, ion plating, and sputtering, etc., or chemical vapor deposition (CVD) including thermal CVD, photo CVD, plasma CVD, and MO-CVD, etc., or electrolytic or non-electrolytic plating, etc.

If the La layer formed on the surface of the metal substrate is too thin, the formed surface layer cannot have a sufficient anti-corrosive effect. If the La layer formed on the surface of the metal substrate is too thick, it is possible that the La layer may crack on its surface. The La layer formed on the surface of the metal substrate may be about 0.1 to about 20 μm thick, preferably about 1 to about 10 μm thick.

Next, the metal substrate having the La layer on its surface is heated such that at least one metal component contained in the metal substrate is diffused into the La layer and a La component in the La layer is diffused into the metal substrate, to form a mixed layer composed of La and at least one metal component on the surface of the metal substrate.

The mixed layer may have a thickness greater than that of the La layer formed in the previous process. That is, the whole La layer formed in the previous process is converted to the mixed layer and a partial thickness of the metal substrate facing the La layer is also converted to the mixed layer. Depending on a degree of diffusion, the composition of the mixed layer can vary along a thickness direction.

At least one metal component contained in the metal substrate may be any metal that can easily form an oxide with La and provide anti-corrosive effect and conductivity of the formed oxide. Examples of the metal component may include Ni, Ti, Cr, Mo, W, Al, V, Co, Cu, Fe, Mn or mixtures thereof. Examples of the at least one metal component diffused into the La layer in the heating of the metal substrate having the La layer on its surface may include Ni, Ti, Cr, Mo, W, Al, V, Co, Cu, Fe, Mn or mixtures thereof.

If the heating temperature of the metal substrate having the La layer on its surface is too low, the rate of diffusion of the metal component becomes slow, and thus it may be difficult to form lanthanum oxides. If the heating temperature is too high, an excess of lanthanum oxides may be formed on the surface layer, resulting in an increase of the surface resistance of the separator. Considering this, the heating temperature may range from about 300 to about 900° C., preferably from about 400 to about 800° C., and more preferably about 600 to about 700° C.

The heating time of the metal substrate having the La layer on its surface is not critical. The heating time can easily be selected by those of ordinary skilled in the art, depending on the operating conditions, such as the heating temperature and the desired degree of diffusion, etc.

Next, the mixed layer is heated under an oxidizing atmosphere to form a layer of oxides containing La and the at least one metal component on the surface of the metal substrate. The oxidizing atmosphere can be comprised of atmospheric air, $O_2$, Ar, $N_2$, $H_2$, or mixtures thereof. During this heating, the whole mixed layer may be converted into the oxide layer. Alternatively, just a partial thickness of the mixed layer in an outer surface side may be converted to the oxide layer.

In the heating of the mixed layer under an oxidizing atmosphere, the oxide formed on the surface of the metal substrate may be represented by $LaM_xO_3$, where x ranges from 0 to 1 and M is at least one metal component contained in the metal substrate. Since the metal element M originates from the metal substrate, it is not necessarily required to provide a separate source for the metal element M for constituting the conductive oxides. Moreover, since the conductive oxide layer on the metal substrate is formed by interdiffusion between La and the at least one metal element, it rarely generates pinholes and crack due to its volume change in the conductive oxide layer.

In $LaM_xO_3$, a range of x is not specifically limited but it is inversely proportional to the electrical conductivity of $LaM_xO_3$. Considering this, x may be at least 0.0001, preferably at least 0.001, and more preferably at least 0.01. It is noticeable that as x increases to 1, the specific volume of $LaM_xO_3$ increases rapidly. Thus, if the surface layer contains a large amount of $LaM_xO_3$ wherein x is near 1, it is possible that cracks will occur in the surface layer. In view of the electrical conductivity and the probability of occurrence of cracks, an amount of $LaM_xO_3$ wherein x is at least 0.95 in the surface layer may preferably range from about 5 to about 75% by weight, and more preferably between about 35 to about 65% by weight.

The metal element M in $LaM_xO_3$ may comprise at least two metal elements. In this case, $M_x$ may be represented by $M1_{x1}M2_{x2}\ldots$, wherein $x=x1+x2\ldots$ In the present embodiment, each range of x1, x2, etc. is not critical and is not specifically limited. The conductive oxides $LaM_xO_3$ contained in the surface layer may be mixtures of $LaM'_xO_3$, $LaM''_xO_3$, etc. In this case, the mixing ratio of these oxides is not specifically limited.

If the heating temperature of the mixed layer under an oxidizing atmosphere is too low, the rate of diffusion of the metal component becomes slow, and thus it may be difficult to form lanthanum oxides. If the heating temperature is too high, an excess of lanthanum oxides may be formed on the surface layer, resulting in an increase of surface resistance of the separator. Considering this, the heating temperature may range from about 300 to about 900° C., preferably from about 400 to about 800° C., and more preferably from about 600 to about 700° C.

The heating time in the heating of the mixed layer under an oxidizing atmosphere is not critical. The heating time can be easily selected by those of ordinary skilled in the art, depending on operating conditions such as the heating temperature and the desired thickness of the oxide layer, etc.

In the present embodiment of the present invention, the heating of the metal substrate having the La layer on its surface and the heating of the mixed layer under an oxidizing atmosphere can be performed simultaneously by heating the metal substrate having the La layer on its surface under an oxidizing atmosphere. In this way, diffusion of the metal component and formation of the oxide layer can be performed simultaneously.

Hereinafter, the present invention will be described in more detail with reference to the following example. However, this example is given solely for the purpose of illustration and is not intended to limit the scope of the invention.

EXAMPLE

A metal substrate composed of a stainless steel SUS 904L in the form of a bipolar plate was prepared. A composition of SUS 904L is shown in Table 1.

TABLE 1

Composition of SUS 904L (% by weight)

| C | Cr | Ni | Mn | Mo | N | Fe |
|---|----|----|----|----|---|----|
| <0.03 | 17~20 | 9~13 | <1.5 | 2~3 | 0.1~0.2 | Balance |

A La layer having a thickness of 5 μm was coated on a surface of the SUS 904L metal substrate using 99.9% by weight of La as a source. This coating was formed by an electron beam-physical vapor deposition (EB-PVD) method. The SUS 904L metal substrate coated with the La layer was then heated in the presence of air of 700° C. for 3 hours to form a layer of oxides on the surface of the SUS 904L metal substrate.

FIG. 1 is a graph that illustrates the results of X-ray diffraction (XRD) analyses for the SUS 904L metal substrate which was subjected to an anti-corrosion treatment according to this Example and an untreated SUS 904L metal substrate as a comparative example. As illustrated in FIG. 1, it was confirmed that lanthanum-containing oxides, such as $LaCrO_3$, $La_2O_3$, and $LaC_{1-x}M_xO_3$ were formed on the surface of the metal substrate that was subjected to the anti-corrosion treatment.

To estimate the anti-corrosive effect of the SUS 904L metal substrate that was subjected to the above anti-corrosion treatment, the corrosion current was determined by a potentiodynamic test and a potentiostatic test.

Figure 2:
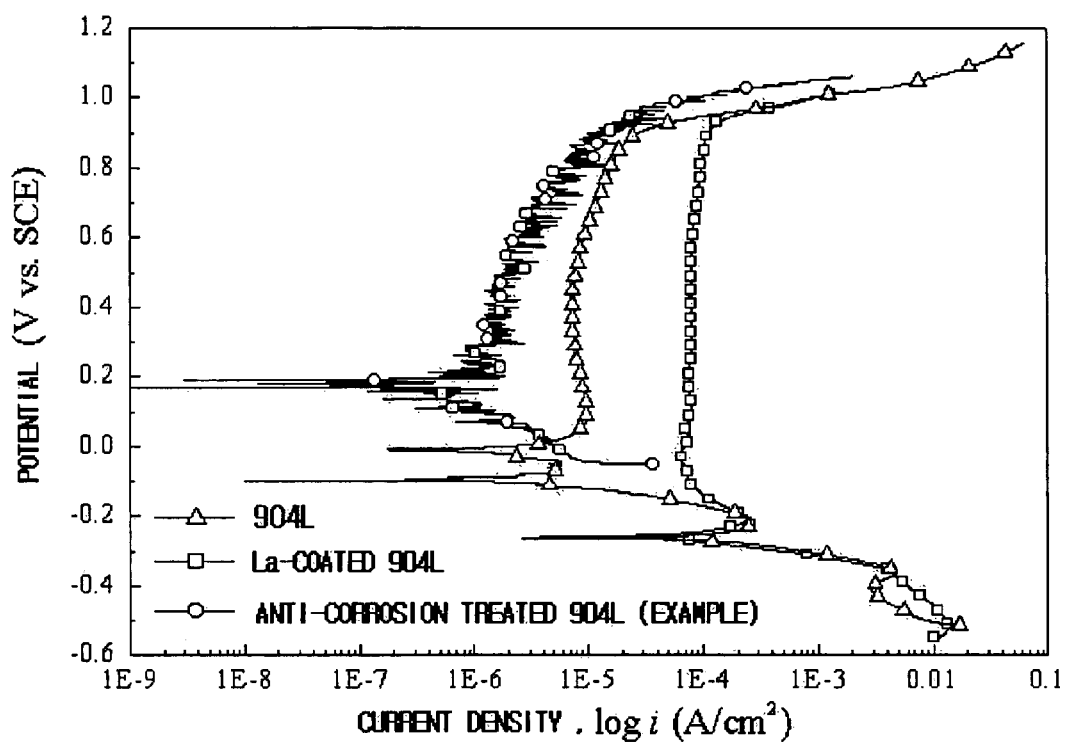
FIG. 2 is a graph that illustrates the determination of a corrosion current by potentiodynamic tests for a SUS 904L metal substrate subjected to an anti-corrosion treatment according to an embodiment of the present invention, an untreated SUS 904L metal substrate, and a SUS 904L metal substrate coated with La as comparative.

The determination of the corrosion current by a potentiodynamic test was performed with air-bubbling in a mixed solution of 1M $H_2SO_4$ and 2 ppm $F^-$ at 80° C. FIG. 2 is a graph that illustrates the results of determining a corrosion current by potentiodynamic tests for the SUS 904L metal substrate that was subjected to an anti-corrosion treatment according to this Example. It also shows an. untreated SUS 904L metal substrate as well as a SUS 904L metal substrate coated with La as comparative examples.

As illustrated in FIG. 2, it was confirmed that the corrosion current of the SUS 904L metal substrate that was subjected to the present anti-corrosion treatment is much lower than that of the untreated SUS 904L metal substrate and the SUS 904L metal substrate coated with La. In addition, it was found that the corrosion current of the SUS 904L metal substrate coated with La is higher than that of the untreated SUS 904L metal substrate. Thus, it demonstrates that the formation of the layer of lanthanum-containing metal oxides on the SUS 904L metal substrate that was subjected to the anti-corrosion treatment according to this Example may be easily accomplished and the layer of lanthanum-containing metal oxides exhibited a strong anti-corrosive effect.

The determination of the corrosion current by a potentiostatic test was performed with air-bubbling in a mixed solution of 1M $H_2SO_4$ and 2 ppm $F^-$ at 80° C. and applying a voltage of 0.6 V based on a reference electrode. The results of determining the corrosion current by potentiostatic tests for a SUS 904L metal substrate that was subjected to the anti-corrosion treatment according to this Example, and an untreated SUS 316L metal substrate, an untreated SUS 904L metal substrate, an untreated Ti substrate, and an untreated $Ti_6Al_4V$ substrate are shown in Table 2.

TABLE 2

| Sample | Example | Comparative example - 316L | Comparative example - 904L | Comparative example - Ti | Comparative example - $Ti_6Al_4V$ |
|---|---|---|---|---|---|
| Corrosion current (μA/cm$^2$) | 0.08 | 2.10 | 0.12 | 0.79 | 51.2 |

As shown in Table 2, the corrosion current of the SUS 904L metal substrate that was subjected to the present anti-corrosion treatment is much lower than those of the comparative examples, which are known as having excellent anti-corrosive properties. Thus, it was confirmed that formation of the layer composed of lanthanum-containing metal oxides on the SUS 904L metal substrate which was subjected to the anti-corrosion treatment according to the embodiment of the present invention may be easily accomplished and the layer composed of lanthanum-containing metal oxides exhibited a strong anti-corrosive effect.

A separator for a fuel cell should possess excellent electronic conductivity as well as excellent anti-corrosive properties. To estimate the electronic conductivity of the SUS 904L metal substrate that was subjected to the above anti-corrosion treatment, the contact resistance for the SUS 904L metal substrate and an untreated SUS 904L metal substrate as a comparative example was determined. The results are shown in FIG. 3.

Figure 3:
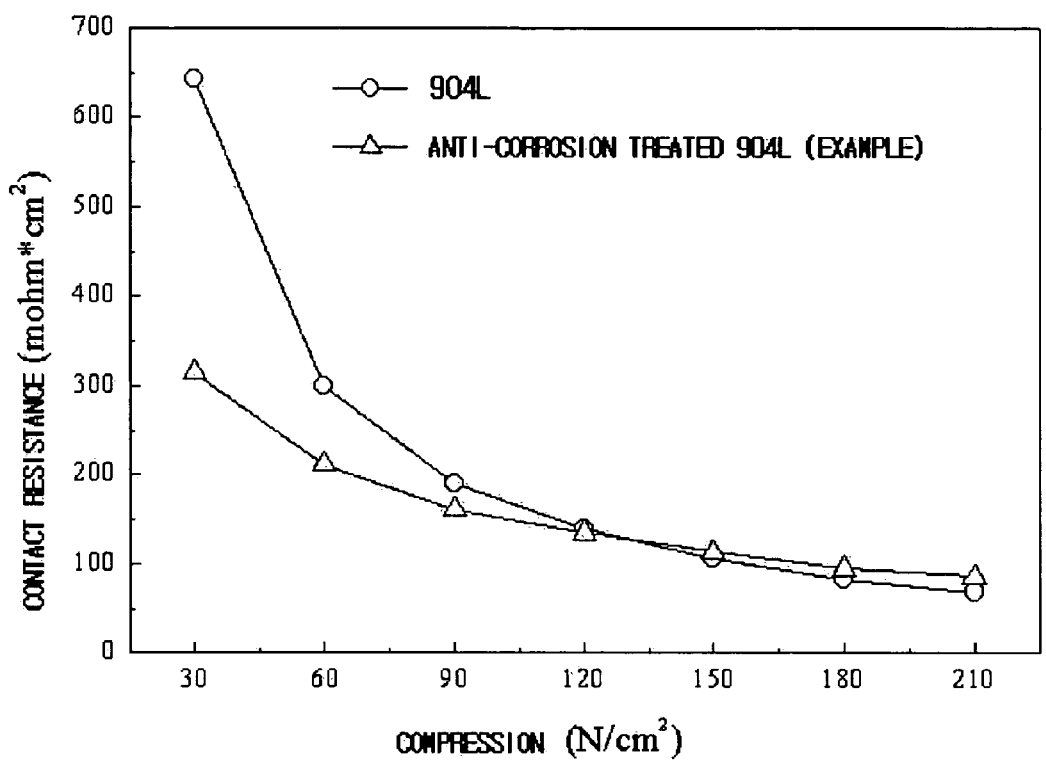
FIG. 3 is a graph that illustrates the results of determining a contact resistance for a SUS 904L metal substrate subjected to an anti-corrosion treatment according to an embodiment of the present invention as well as an untreated SUS 904L metal substrate as a comparative example.

As illustrated in FIG. 3, the electrical resistance increased only slightly because of the oxide coating according to this Example. Further, the layer composed of lanthanum-containing metal oxides formed according to this Example had excellent electrical conductivity, making it suitable for use in a fuel cell.

The separator for a fuel cell according to an embodiment of the present invention has a layer of lanthanum-containing metal oxides on its surface that exhibits excellent electrical conductivity and highly improved anti-corrosive properties.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A separator for a fuel cell, comprising:
   a metal substrate containing at least one metal element M; and
   a surface layer formed on a surface of the metal substrate and comprising at least one conductive oxide represented by $LaM_xO_3$,
   wherein x=0 to 1,
   wherein M is selected from a group consisting of Ni, Ti, Mo, W, V, Cu, and Fe or mixtures thereof.

2. The separator of claim 1,
   wherein the surface layer has a thickness ranging from 0.1 to 500 μm.

3. The separator of claim 1,
   wherein the metal substrate comprises Ni, Ti, stainless steel, or their alloy with at least one selected from the group consisting of Al, W, and Cu.

4. A method for anti-corrosion treatment of a metallic separator for a fuel cell, comprising:
   forming an La layer on a surface of a metal substrate having a desired dimension and a desired flow field formed therein;
   heating the metal substrate having the La layer on its surface such that at least one metal component contained in the metal substrate diffuses into the La layer and an La component from the La layer diffuses into the metal substrate, to form a mixed layer of La and the at least one metal component on the surface of the metal substrate; and
   heating the mixed layer under an oxidizing atmosphere to form a layer of oxides containing La and the at least one metal component on the surface of the metal substrate.

5. The method of claim 4,
   wherein the La layer formed on the surface of the metal substrate has a thickness ranging from 0.1 to 500 μm.

6. The method of claim 4,
   wherein the metal substrate comprises an element selected from the group consisting of Ni, Ti, Cr, Mo, W, Al, V, Co, Cu, Fe, and Mn or mixtures thereof.

7. The method of claim 4,
   wherein the at least one metal component of the metal substrate that diffuses into the La layer may be selected from the group consisting of Ni, Ti, Cr, Mo, W, Al, V, Co, Cu, Fe, and Mn or mixtures thereof.

8. The method of claim 4,
   wherein the heating temperature of the metal substrate having the La layer on its surface ranges from 300 to 900°C.

9. The method of claim 4,
   wherein the formed oxides in the mixed layer, are represented by $LaM_xO_3$, and wherein x=0 to 1 and M is a metal component contained in the metal substrate.

10. The method of claim 4,
    wherein the heating temperature of the mixed layer under an oxidizing atmosphere ranges from 300 to 900°C.

* * * * *